(12) United States Patent
Li et al.

(10) Patent No.: US 8,146,977 B2
(45) Date of Patent: Apr. 3, 2012

(54) VEHICULAR SEATING SYSTEM

(75) Inventors: Yuenian Richard Li, Novi, MI (US); Tom Ciarelli, Plymouth, MI (US)

(73) Assignee: Ford Global Technologies, Dearborn, MI (US)

( * ) Notice: Subject to any disclaimer, the term of this patent is extended or adjusted under 35 U.S.C. 154(b) by 90 days.

(21) Appl. No.: 12/831,359

(22) Filed: Jul. 7, 2010

(65) Prior Publication Data
US 2012/0007380 A1   Jan. 12, 2012

(51) Int. Cl.
*B60N 2/14* (2006.01)
*B60N 2/20* (2006.01)

(52) U.S. Cl. ...................... 296/65.09; 297/15

(58) Field of Classification Search ............... 296/65.09; 297/15
See application file for complete search history.

(56) References Cited

U.S. PATENT DOCUMENTS

| 5,238,285 | A | 8/1993 | Holdampf et al. |
| 6,837,530 | B2 | 1/2005 | Rudberg et al. |
| 6,955,386 | B2 | 10/2005 | Rhodes et al. |
| 7,198,316 | B2 | 4/2007 | Lutzka et al. |
| 7,273,243 | B2* | 9/2007 | Prugarewicz ............. 296/65.09 |
| 7,320,501 | B2* | 1/2008 | Keyser et al. ............. 297/378.12 |
| 7,367,624 | B2* | 5/2008 | Garland ................. 297/362.11 |
| 7,434,862 | B2* | 10/2008 | Lutzka et al. .............. 296/65.03 |
| 7,717,489 | B2* | 5/2010 | Mitsuhashi ................ 296/65.09 |
| 2001/0052718 | A1* | 12/2001 | Sugiura et al. .................. 297/15 |
| 2010/0164265 | A1* | 7/2010 | Tomandl ....................... 297/326 |

FOREIGN PATENT DOCUMENTS

| EP | 2001707 B1 | 1/2010 |
| JP | 2009227157 A2 | 10/2009 |
| WO | WO 2008019033 A1 | 2/2008 |

* cited by examiner

*Primary Examiner* — Dennis Pedder
(74) *Attorney, Agent, or Firm* — Jerome R. Drouillard; Greg P. Brown

(57) ABSTRACT

A vehicular seating system includes a seat cushion pivotably attached to a support structure, with the said seat cushion having a stowed position and a deployed position. A base latch selectively secures the seat cushion in its deployed position. A seatback is hinged to the seat cushion, with the seatback having a folded position and an unfolded position. A base latch interlock is configured to permit the base latch to release only when the seatback is in its stowed, folded position.

10 Claims, 5 Drawing Sheets

VEHICULAR SEATING SYSTEM

TECHNICAL FIELD

The present invention relates to a stowable seat for a vehicle.

BACKGROUND

Stowable seats are commonly used in sport utility and so-called crossover vehicles. Typically, such seats include a seat cushion and a foldable seatback. Prior to stowing seats having a subfloor storage location, it is necessary to fold the seatback unto the seat cushion. If this folding operation is not performed prior to attempting to stow the seat, the results will not be favorable, because the unfolded seatback will inhibit the seat from nesting into the storage compartment. It would be desirable to provide a seat having a logic system which allows the seat, and more precisely, the seat cushion, to be released for pivoting into a stowed position only if the seatback has first been placed in a folded, stowed position with respect to the seat cushion.

SUMMARY

According to an aspect of the invention, a vehicular seating system includes a seat cushion pivotably attached to a support structure, with said seat cushion having a stowed position and a deployed position and a base latch for securing the seat cushion in the deployed position. A seatback is hinged to the seat cushion, with the seatback having a folded position and an unfolded position.

According to another aspect of the invention, a base latch interlock is provided. The base latch interlock is configured to prevent the base latch from releasing whenever said seatback is in its deployed position. In a preferred embodiment, the base latch interlock includes a first flexible member extending from a cable crank attached to the seatback to a second flexible member extending from a position on the seat cushion to the base latch, with the first flexible member preventing movement of the second flexible member to release the base latch if the seatback is in the unfolded position. The first flexible member applies a tension to the second flexible member, preventing the second flexible member from releasing the base latch when the seatback is in its unfolded position. Stated another way, the first flexible member applies a restraining tension to the second flexible member when the seatback is in its unfolded position, with the first flexible member being slack when the seatback is in its folded position, such that the second flexible member has sufficient freedom of movement to release said base latch.

According to another aspect of the present invention, a vehicular seating system has at least three operating states, including a first state, in which a seat cushion is in a deployed position, and a seatback is in an unfolded position, with the first state being characterized by a base latch interlock preventing the seat cushion's base latch from releasing. A second operating state is characterized by the seat cushion being in its deployed position, with the seatback is in its folded position, with the second state being further characterized by the base latch interlock permitting the base latch to release. A third operating state is characterized by the seat cushion and seatback being pivoted away from the seat cushion's deployed position and into a storage compartment configured in a vehicle floor.

It is an advantage of the present invention that proper stowage of a seat within a vehicle storage compartment is assured without the need for excessive levers, pulls, or other actuators.

It is a further advantage of the present invention that improper stowage of a seat will be prevented.

Other advantages, as well as features of the present invention, will become apparent to the reader of this specification.

DESCRIPTION OF INVENTION

Figure 1:
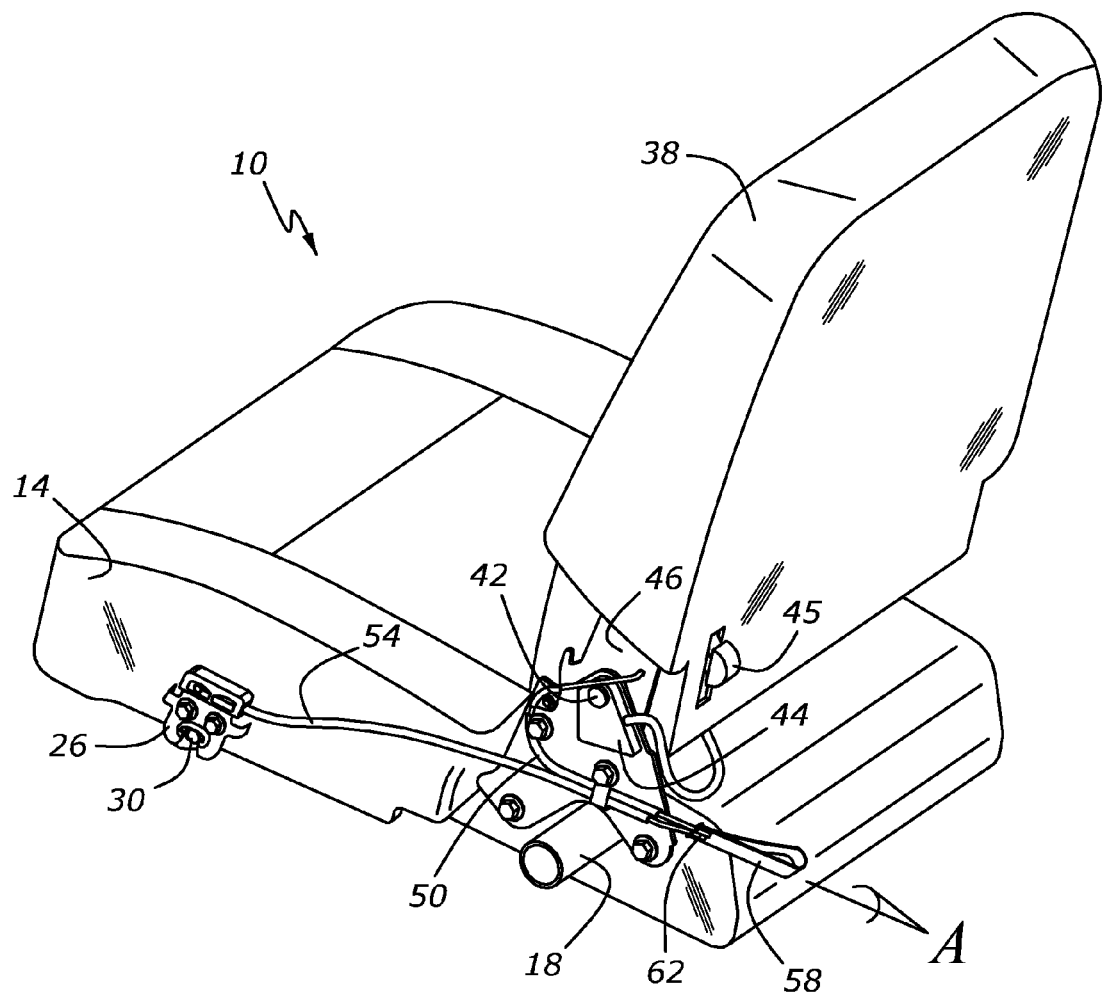
FIG. 1 is a perspective view of a seating system according to an aspect of the present invention.
Figure 5A:
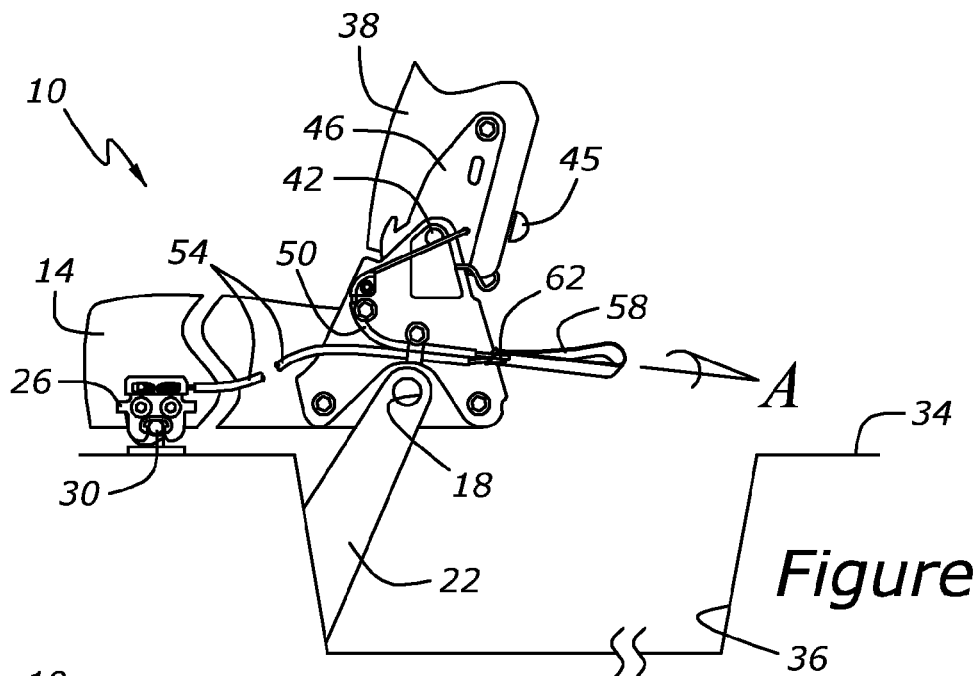
FIG. 5 shows three defined operating states of the seat of FIGS. 1-4.
Figure 5B:
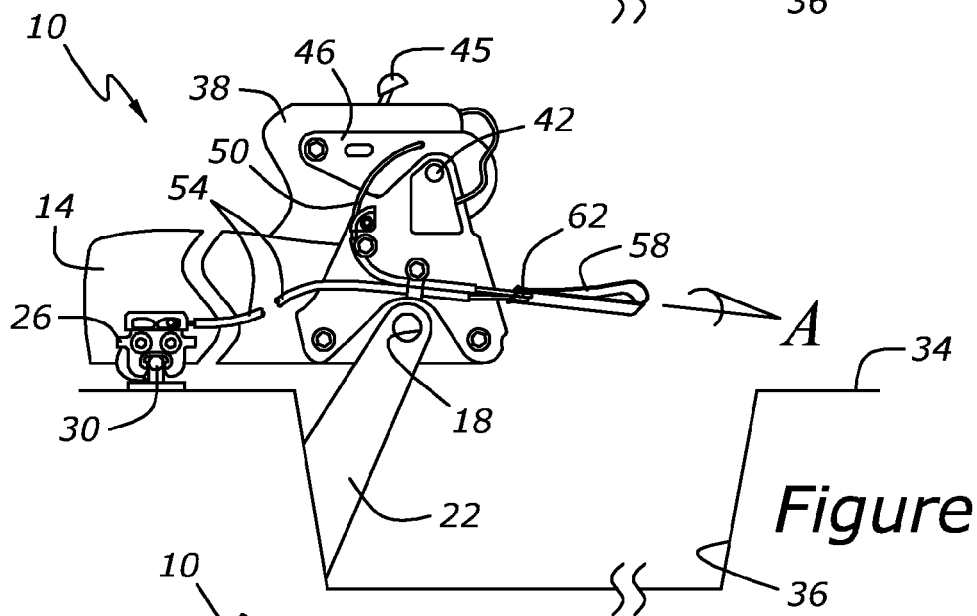
Figure 5C:
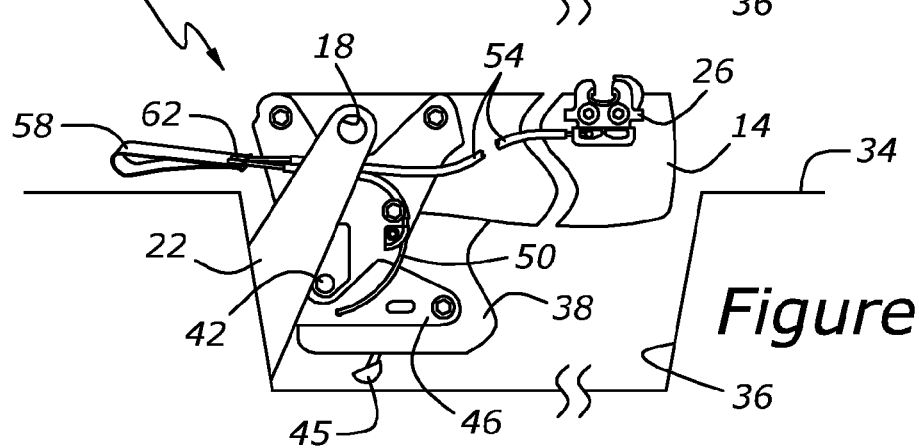

As shown first in FIG. 1, a vehicular seating system has a seat cushion, 14, which is pivotably attached to a floor mounting bracket, 22, by a pivot tube, 18. Bracket 22 and pivot tube 18 permit seat 10 to be rotated from an unfolded, deployed position, generally shown in FIG. 1, to a folded, stowed position generally shown in FIG. 5C.

Prior to stowing seat 10, it must first be placed in the folded position generally shown in FIGS. 3, 4, and 5B and 5C. More precisely, if seatback 38 is not folded about pivot 40 prior to rotation of seat 10 from its deployed state, the stowage operation will not be successful because seatback 38 will prevent seat 10 from rotating into its stowed position. As detailed below, a base latch interlock is provided to prevent improper cycling of the seat into an undefined stowage position.

Seat cushion 14 is maintained in its deployed position by a base latch, 26, which engages with a latch striker, 30, attached to vehicle floor 34. When base latch 26 is released, seat cushion 14 and seatback 38 may be rotated from the deployed position shown in FIG. 1 to the stowed position shown in FIG. 5C.

Figure 2:
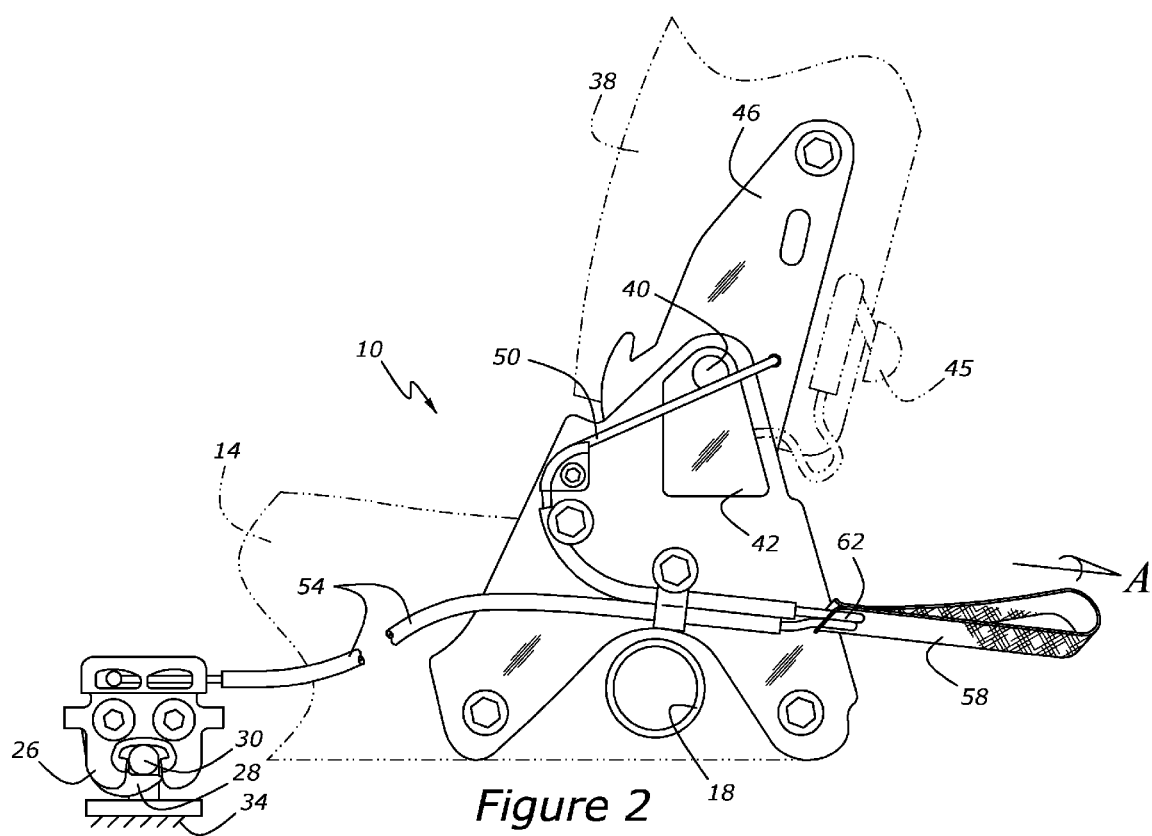
FIG. 2 is a partial side elevation of a seat according to the present invention, showing the seat cushion in a deployed, or latched position, and the seatback in the unfolded, or deployed position.
Figure 3:
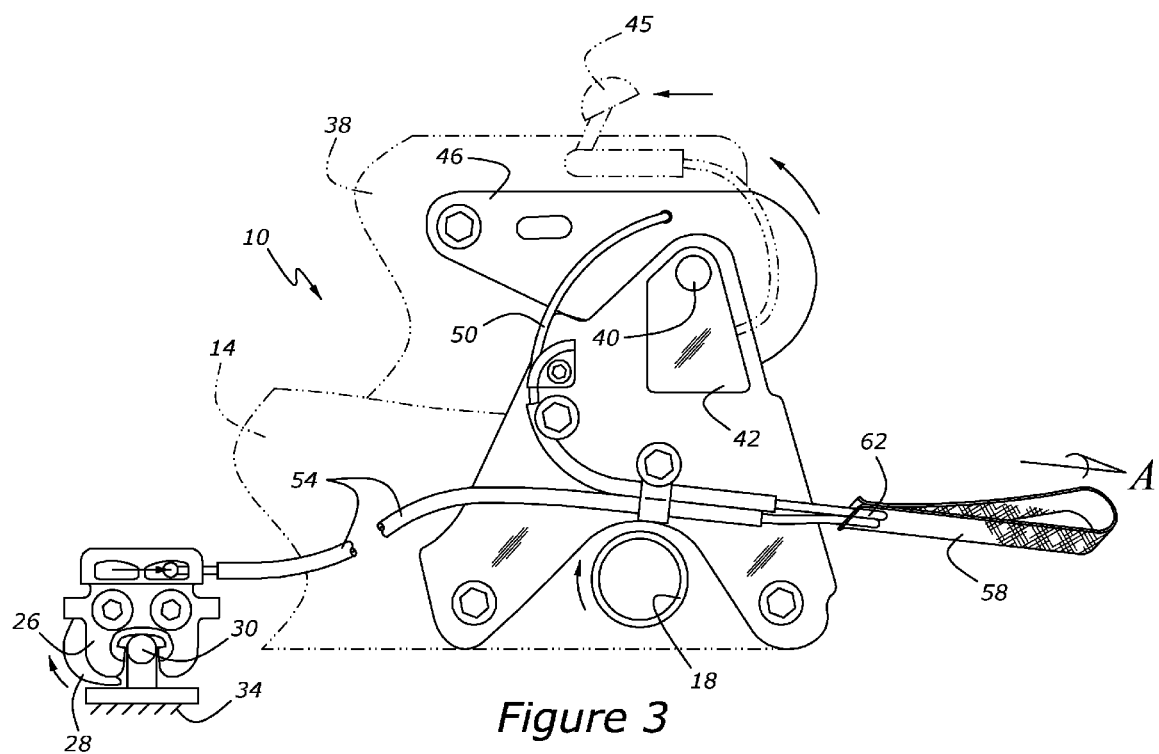
FIG. 3 is similar to FIG. 2, but shows the seat cushion released and the seatback in a folded, or stowed position.

Base latch 26 is released by manually pulling handle 58 in direction A shown in FIGS. 1, 2, 3, 5A, and 5B. Pulling handle 58 causes latch finger 28 to move from a closed position, shown in FIG. 2, to an open position shown in FIGS. 3 and 4. However, prior to pulling handle 58, seatback 38 must first be placed in its folded, or stowed position, as shown in FIG. 3. Prior to folding seatback 38, seatback latch 44 must be released by manually moving seatback latch handle 45.

Base latch 26 is interlocked by the action of cable crank 46, first flexible member (first cable) 50, second flexible member (latch cable) 54, and cable junction 62. FIG. 2, which depicts seatback 38 in its unfolded or deployed position, shows first cable 50 under tension from cable crank 46. Because first cable 50 and latch cable 54 are attached together by cable junction 62, the tensile force exerted on cable junction 62 and latch cable 54 by first cable 50 prevents handle 58 from being moved in direction A. As a result, it is not possible to release base latch 26.

Figure 4:
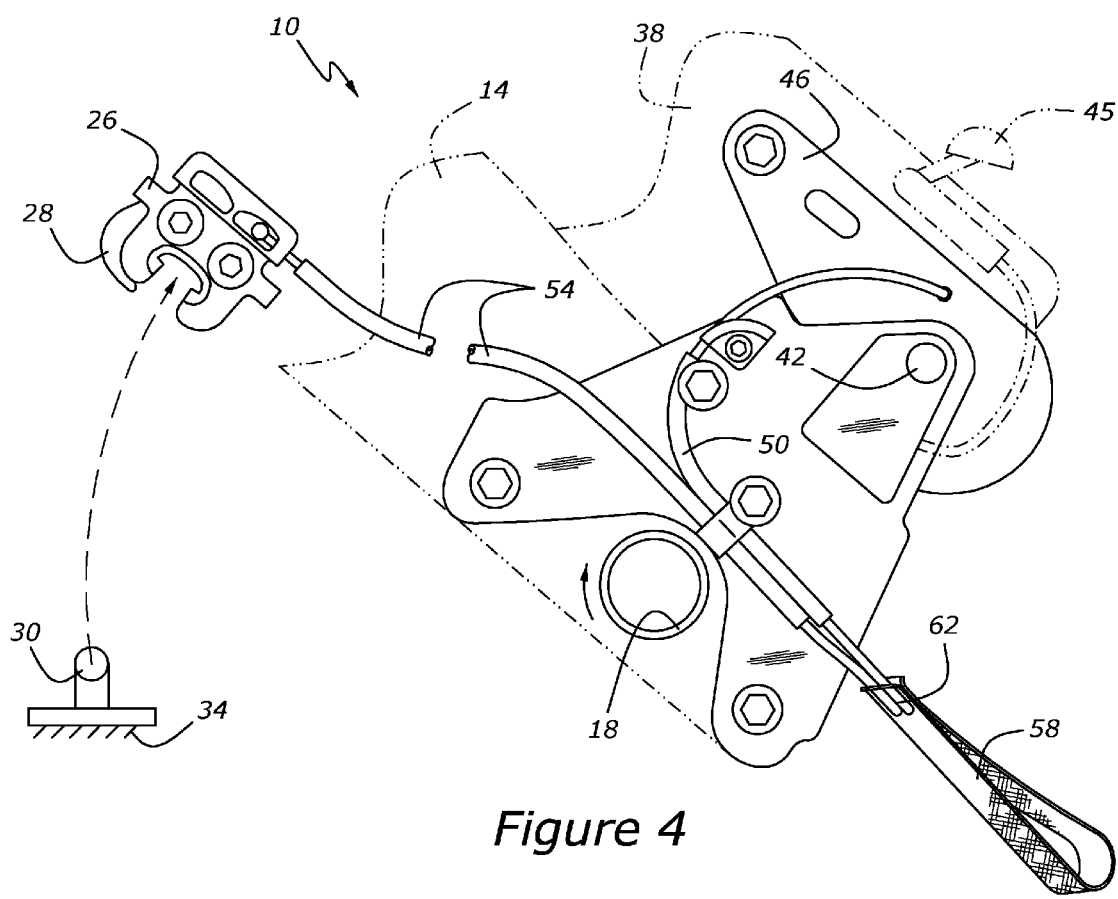
FIG. 4 shows the seat partially pivoted from a deployed to a stowed position.

FIG. 3 shows seatback 38 in its folded, stowed position, which is characterized by first cable 50 being in a slack condition due to the rotation of seatback 38 and cable crank 46, which rotates in unison with seatback 38. When first cable 50 is slack, sufficient freedom is afforded latch cable 54 so that manual activation of handle 58 in direction A of the various Figures will release latch finger 28 and allow seat 10 to be rotated upwardly as shown in FIG. 4, and into the stowed position shown in FIG. 5C.

It is thus understood that the present inventive vehicular seating system has at least three operating states, including a first state, in which state seat cushion 14 is in a deployed position, and seatback 38 is in an unfolded, deployed position, with the first state being characterized by base latch interlock 46, 50, 54, preventing base latch 26 from releasing. A second operating state is characterized by seat cushion 14 being in its deployed position, with seatback 38 in its folded position, with the second state being further characterized by base latch interlock 46, 50, 54 permitting base latch 26 to release when handle 58 is moved in a specified direction. A third operating state is characterized by seat cushion 14 and seatback 38 being pivoted away from the seat cushion deployed position and into storage compartment 36 configured in vehicle floor 34.

Although the present invention has been described in connection with particular embodiments thereof, it is to be understood that various modifications, alterations, and adaptations may be made by those skilled in the art without departing from the scope of the invention set forth in the following claims.

What is claimed is:

1. A vehicular seating system, comprising:
   a seat cushion pivotably attached to a support structure, with said seat cushion having a stowed position and a deployed position;
      a base latch for securing said seat cushion in said deployed position;
      a seatback hinged to said seat cushion, with said seatback having a folded position and an unfolded position; and
      a base latch interlock configured to prevent said base latch from releasing whenever said seatback is in said deployed position, wherein said base latch interlock comprises a first flexible member extending from said seatback to a second flexible member extending from a position on said seat cushion to said base latch, with said first flexible member preventing movement of said second flexible member to release said base latch if said seatback is in said unfolded position.

2. The seating system according to claim 1, wherein said first flexible member applies a restraining tension to said second flexible member, preventing said second flexible member from releasing said base latch, when said seatback is in said unfolded position.

3. The seating system according to claim 1, wherein said first flexible member applies a restraining tension to said second flexible member when said seatback is in said unfolded position, with said first flexible member being slack when said seatback is in said folded position, such that said second flexible member has sufficient freedom of movement to release said base latch.

4. The seating system according to claim 1, further comprising a seatback latch configured to releasably maintain said seatback in said unfolded position.

5. The seating system according to claim 1, wherein said base latch secures said seat cushion to the floor of a vehicle.

6. The seating system according to claim 1, further comprising a storage compartment, configured within a vehicle floor, for accepting said seat cushion and said seatback when said seat cushion is pivoted upon said support structure from said deployed position to said stowed position.

7. A vehicular seating system, comprising:
   a seat cushion pivotably attached to a support structure, with said seat cushion being pivotable between a stowed position within a storage compartment configured within a vehicle floor, and a deployed position;
   a base latch for securing said seat cushion to the vehicle floor when said seat cushion is in said deployed position, with said base latch selectively preventing the seat cushion from pivoting to the stowed position;
   a seatback hinged to said seat cushion, with said seatback having a folded, stowed position and an unfolded, deployed position; and
   a base latch interlock configured to prevent said base latch from releasing whenever said seatback is in said unfolded, deployed position, whereby said seat cushion will be prevented from moving from said unfolded, deployed position to said folded, stowed position unless said seatback is in said folded, stowed position, wherein said base latch interlock comprises a first cable extending from a cable crank affixed to said seatback to a latch cable extending from a position on said seat cushion to said base latch, with said cable crank and said first cable applying a tension which prevents movement of said latch cable to release said base latch if said seatback is in said unfolded, deployed position.

8. The seating system according to claim 7, wherein said cable crank is configured to tension said first cable when said seatback is in said unfolded, deployed position, with said cable crank being further configured to provide slack in said first cable when said seatback is in said folded, stowed position.

9. A vehicular seating system, comprising:
   a seat cushion pivotably attached to a support structure, with said seat cushion being pivotable between a stowed position and a deployed position;
   a base latch for securing said seat cushion in said deployed position;
   a seatback hinged to said seat cushion, with said seatback having a folded position and an unfolded position; and
   a base latch interlock configured to prevent said base latch from releasing whenever said seatback is in said unfolded position, wherein said seating system has at least three operating states, comprising:
      a first state, in which said seat cushion is in its deployed position, and said seatback is in said unfolded position, with said first state being characterized by said base latch interlock preventing said base latch from releasing;
      a second state, in which said seat cushion is in its deployed position, and said seatback is in said folded position, with said second state being characterized by said base latch interlock permitting said base latch to release; and
      a third state, in which said seat cushion and said seatback are pivoted away from the seat cushion deployed position and into a storage compartment configured in a vehicle floor, wherein said base latch interlock comprises a first cable extending from a cable crank affixed to said seatback to a latch cable extending from a position on said seat cushion to said base latch, with said cable crank and said first cable applying a tension which prevents movement of said latch cable to release said base latch if said seatback is in said unfolded position.

10. The seating system according to claim 9, wherein said cable crank is configured to tension said first cable when said seatback is in said unfolded position, with said cable crank being further configured to provide slack in said first cable when said seatback is in said folded position.

* * * * *